(12) United States Patent
Kano et al.

(10) Patent No.: US 7,252,710 B2
(45) Date of Patent: *Aug. 7, 2007

(54) PIGMENT DISPERSION COMPOSITION, USE THEREOF AND COMPOUND FOR PIGMENT TREATMENT

(75) Inventors: Masanori Kano, Osaka (JP); Kazunori Itoh, Osaka (JP); Takaaki Yodo, Osaka (JP)

(73) Assignee: Sakata Inx Corp., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/519,077

(22) PCT Filed: Jun. 26, 2003

(86) PCT No.: PCT/JP03/08069

§ 371 (c)(1),
(2), (4) Date: Aug. 15, 2005

(87) PCT Pub. No.: WO2004/003085

PCT Pub. Date: Jan. 8, 2004

(65) Prior Publication Data

US 2005/0284335 A1    Dec. 29, 2005

(30) Foreign Application Priority Data

Jun. 26, 2002 (JP) ............................. 2002-186839
Jun. 26, 2002 (JP) ............................. 2002-186840

(51) Int. Cl.

| | |
|---|---|
| C09B 67/00 | (2006.01) |
| C09B 67/20 | (2006.01) |
| C09B 67/46 | (2006.01) |
| C08K 5/29 | (2006.01) |
| C07C 349/02 | (2006.01) |
| G03C 1/00 | (2006.01) |
| G03F 7/004 | (2006.01) |
| G02B 5/20 | (2006.01) |
| G02B 5/00 | (2006.01) |

(52) U.S. Cl. ..................... 106/499; 106/410; 106/411; 106/413; 106/493; 106/494; 106/495; 106/496; 106/497; 106/498; 430/270.1; 524/495; 564/252

(58) Field of Classification Search ................ 106/476, 106/493, 499, 410, 411, 413, 494, 495, 496, 106/497, 498; 524/495; 562/252; 430/270.1
See application file for complete search history.

(56) References Cited

U.S. PATENT DOCUMENTS

| | | | | |
|---|---|---|---|---|
| 5,371,148 | A * | 12/1994 | Taylor et al. | 525/293 |
| 5,439,982 | A * | 8/1995 | Taylor et al. | 525/293 |
| 5,602,264 | A * | 2/1997 | Rapoport et al. | 549/448 |
| 6,730,807 | B1 * | 5/2004 | Haberle et al. | 562/439 |
| 2003/0088030 | A1* | 5/2003 | Haberle et al. | 525/326.6 |
| 2005/0118424 | A1* | 6/2005 | Takahashi et al. | 428/402 |
| 2006/0094851 | A1* | 5/2006 | Audenaert et al. | 528/44 |

FOREIGN PATENT DOCUMENTS

| | | |
|---|---|---|
| JP | 54-37082 | 3/1979 |
| JP | 2001-356210 | 12/2001 |
| JP | 2002-201381 | 7/2002 |
| WO | WO 03/076527 A1 | 12/2004 |

* cited by examiner

*Primary Examiner*—Anthony J. Green
(74) *Attorney, Agent, or Firm*—Westerman, Hattori, Daniels & Adrian, LLP.

(57) ABSTRACT

A pigment dispersion composition which can be suitably applied in such fields as color filters, black matrices and ink jet recording where it is necessary to finely disperse pigments still with retention of good dispersion stability and temporal stability even when the total amount a pigment derivative, pigment intermediate, colorant derivative and colorant intermediate, and/or a pigment dispersant is small. Another object is a pigment dispersion-based resist composition which can give color filters high in permeability, excellent in contrast and causing no bleeding or black matrices high in light-shielding and insulating properties, and causing no bleeding. And a pigment dispersion composition which is prepared by dispersing a pigment using a pigment derivative, pigment intermediate, colorant derivative and/or colorant intermediate each having a functional group reactive with a carbodiimide group and having adsorption ability on the pigment surface, and a carbodiimide compound containing at least one carbodiimide group.

13 Claims, No Drawings

PIGMENT DISPERSION COMPOSITION, USE THEREOF AND COMPOUND FOR PIGMENT TREATMENT

TECHNICAL FIELD

The present invention relates to a pigment dispersion composition and a use thereof and, more particularly, to a pigment dispersion composition used for such as printing inks, paints, pigment dispersion-based resist compositions for color filters and black matrices, and inks for ink jet printing, and having good fluidity and dispersion stability even in a state that the pigment concentration is high and the pigment is finely dispersed. Moreover, the invention relates to a pigment dispersion-based resist composition capable of producing black matrices having high insulating characteristics and color filters having high transmissivity and high contrast, and excellent in developing characteristics. Furthermore, the invention relates to a treating compound suited for the treatment of pigments.

BACKGROUND ART

It is a current tendency to utilize pigments as colorants not only in various printing inks and paints but also in those fields in which clearer colorations are required, for example in pigment dispersion-based resist compositions for color filters and inks for ink jet printing.

In recent years, marked advances have been made in the technology of dispersing such pigments. The method which is used for further rationalization of production processes comprises carrying out dispersion so as to increase the pigment concentration as far as possible. However, there is a fundamental problem that as the pigment concentration increases, the fluidity and dispersion stability decrease.

In addition, in the fields of color filters and ink jet recordings, where high levels of fastness are required, it is necessary to use high-grade pigments and reduce the particle diameter to a finer level so that clearer colorations may be accomplished. However, high-grade pigments are by nature poor in dispersion stability as compared with other pigments and, further, as the particle diameter becomes finer, the tendency toward aggregation increases and it becomes difficult to obtain stable dispersions.

On the other hand, carbon black is widely used as a pigment showing a high level of blackness. However, it has problems, namely difficulty in attaining high concentrations thereof and insufficiency in dispersion stability due to its characteristics that its primary particle diameter is very small and it is porous and has a large specific surface area. Recently, attempts have been made to use carbon black also as a light-shielding material for black matrices. It is a problem, however, that it is difficult to obtain highly insulating black matrices from carbon black which is highly conductive.

Therefore, for solving such problems, investigations have been made concerning, for example, the treatment (surface treatment/modification) of pigments themselves or the development of pigment dispersants, pigment derivatives or surfactants, each having marked ability to wet (adsorption ability) pigments and/or be wetted to increase the pigment dispersion stability and/or pigment concentration, and a number of research works are now still going on.

For example, as a method utilizing acid-based affinity, Japanese Kokai Publication Sho-54-037082 discloses a method of attaining good pigment dispersibility and pigment dispersion stability by utilizing a basic group-containing pigment dispersant for dispersing acidic pigments and thus allowing the pigment dispersant to be adsorbed on the pigment surface through acid-based affinity.

Moreover, a method utilizing affinity attributable to similarity of the molecular structure using pigment derivatives, etc. has also been investigated. For example, in Japanese Kokai Publication 2001-356210, there is disclosed a method of obtaining good dispersion stability by using a phthalocyanine pigment derivative introduced with a sulfonic acid group to make a pigment derivative be adsorbed on the pigment surface having similarity in the molecular structure.

Furthermore, the applicant proposes, as a method utilizing the covalent bonding between a functional group occurring on the pigment surface and a dispersion-treating compound, a method of obtaining good pigment dispersibility by using a carbodiimide group-containing compound for dispersing a pigment having a functional group reactive with a carbodiimide group such as an acid group, amine group and hydroxyl group to make the covalent bonding between said functional groups have higher bonding power in Japanese Kokai Publications 2002-201381 and 2002-186838.

However, in such method utilizing acid-based affinity, an acid group is required to occur, or in such method utilizing the covalent bonding, a functional group reactive with a carbodiimide group is required to occur, on the pigment surface, respectively. Thus, there has been a problem that these methods could not be applied to pigments which do not contain those functional groups.

Furthermore, when the functional group reactive with a carbodiimide group is an amino group or hydroxyl group, the reaction temperature is high, thus there has also been a problem that heating is required at the time of dispersion treatment for pigments having these functional groups.

On the contrary, in the method utilizing affinity attributable to similarity of the molecular structure, although the pigment surface does not require to have a special functional group, there has also been a problem that a large amount of materials must be used for dispersing a pigment.

For example, in the method described in Japanese Kokai Publication 2001-356210, the pigment is dispersed by combinedly using a pigment derivative and pigment dispersant, but when the total amount of the pigment derivative and the pigment dispersant to be used is reduced, preferable pigment dispersibility or dispersion stability cannot be obtained. Thus, there is a major problem that it becomes difficult to correspond to high concentration of the pigment.

In addition, if the pigment derivative containing an acid group occurs in a composition, when the composition is used as a pigment dispersion-based resist composition for color filters and black matrices, there is a problem that the liquid crystal display screen is defaced as a result of bleeding of a pigment derivative during the alkaline development.

SUMMARY OF THE INVENTION

It is an object of the present invention to provide a pigment dispersion composition which can be suitably applied in such fields as color filters, black matrices and ink jet recording where it is necessary to disperse pigments still more finely and which can retain good dispersion stability and temporal stability even when the total amount to be used of at least one species selected from the group consisting of pigment derivatives, pigment intermediates, colorant derivatives and colorant intermediates, and a pigment dispersant is small. Another object is to provide a pigment dispersion-based resist composition which can give color filters high in permeability, excellent in contrast and the like and causing no bleeding or black matrices high in light-shielding and insulating properties, and causing no bleeding. A further object is to provide a pigment-treating compound suited for the treatment of pigments.

As a result of intensive investigations made to accomplish the above objects, the present inventors found that all the above objects can be attained when a pigment dispersion composition is used which is prepared by dispersing the pigment using a carbodiimide compound and at least one species selected from the group consisting of pigment derivatives, pigment intermediates, colorant derivatives and colorant intermediates each having a functional group reactive with a carbodiimide group and having adsorption ability on the pigment surface. Based on such and other findings, the present invention has been completed.

That is, the present invention relates to (1) a pigment dispersion composition which is prepared by dispersing a pigment using at least one species selected from the group consisting of a pigment derivative, pigment intermediate, colorant derivative and colorant intermediate each having a functional group reactive with a carbodiimide group and having adsorption ability on the pigment surface, and a carbodiimide compound containing at least one carbodiimide group.

The invention further relates to (2) the pigment dispersion composition according to the above (1), wherein the pigment is dispersed using a mixture comprising at least one species selected from the group consisting of said pigment derivative, pigment intermediate, colorant derivative and colorant intermediate, and said carbodiimide compound.

The invention further relates to (3) the pigment dispersion composition according to the above (1), wherein the pigment is dispersed by using a carbodiimide-based compound introduced with a side chain having pigment adsorption ability within the molecule by reacting at least one species selected from the group consisting of said pigment derivative, pigment intermediate, colorant derivative and colorant intermediate with said carbodiimide compound.

The invention further relates to (4) the pigment dispersion composition according to any one of the above (1) to (3), wherein said carbodiimide compound contains, within the molecule thereof, at least one side chain selected from the group consisting of a polyester side chain, polyether side chain, polyether polyester side chain, and polyacrylic side chain.

The invention further relates to (5) the pigment dispersion composition according to any one of the above (1) to (4), wherein said carbodiimide compound has a carbodiimide equivalent of 100 to 50,000.

The invention further relates to (6) the pigment dispersion composition according to any one of the above (1) to (5), wherein the functional group reactive with a carbodiimide group contained in said pigment derivative, pigment intermediate, colorant derivative and/or colorant intermediate is a carboxyl group, sulfonic acid group, or phosphoric acid group.

The invention further relates to (7) the pigment dispersion composition according to any one of the above (1) to (6), wherein said pigment intermediate is at least one species selected from the group consisting of a naphthoic acid and 2-carboxypyrazine, and said colorant intermediate is a colorant residue having a functional group reactive with a carbodiimide group.

The invention further relates to (8) the pigment dispersion composition according to any one of the above (1) to (6), wherein said pigment is at least one pigment selected from the group consisting of a dye chelate pigment, azo pigment, benzimidazolone pigment, phthalocyanine pigment, quinacridone pigment, anthraquinone pigment, dioxazine pigment, indigo pigment, thioindigo pigment, perylene pigment, perinone pigment, diketopyrrolopyrrole pigment, isoindolinone pigment, nitro pigment, nitroso pigment, anthraquinone pigment, flavanthrone pigment, quinophthalone pigment, pyranthrone pigment, indanthrone pigment, and said pigment derivative is a derivative of said pigment.

The invention further relates to (9) the pigment dispersion composition according to any one of the above (1) to (6), which is prepared by dispersing at least one pigment selected from the group consisting of carbon black and a phthalocyanine pigment using a phthalocyanine pigment derivative having a functional group reactive with a carbodiimide group as said pigment derivative.

The invention further relates to

(10) a pigment dispersion-based resist composition which contains the pigment dispersion composition according to any one of the above (1) to (9).

Still further, the invention relates to

(11) a compound for pigment treatment which is a carbodiimide-based compound introduced with a side chain having pigment adsorption ability within the molecule by reacting at least one species selected from the group consisting of a pigment derivative, pigment intermediate, colorant derivative and colorant intermediate each having a functional group reactive with a carbodiimide group and having adsorption ability on the pigment surface, and a carbodiimide compound containing at least one carbodiimide group.

DETAILED DESCRIPTION OF THE INVENTION

In the following, the pigment dispersion composition and the pigment dispersion-based-resist composition containing said pigment dispersion composition according to the invention are described in detail.

The pigment dispersion composition of the invention is a pigment dispersion composition which is prepared by dispersing a pigment using at least one species selected from the group consisting of a pigment derivative, pigment intermediate, colorant derivative and colorant intermediate each having a functional group reactive with a carbodiimide group and having adsorption ability on the pigment surface, and a carbodiimide compound containing at least one carbodiimide group. Since at least one species selected from the group consisting of the above-mentioned pigment derivative, pigment intermediate, colorant derivative, and colorant intermediate is (are) adsorbed on the pigment surface, and react(s) with the carbodiimide group contained in the carbodiimide compound to form a thick adsorption layer on the pigment surface, the composition becomes to have preferable fluidity and dispersion stability. The functional group reactive with a carbodiimide group contained in the above-mentioned pigment derivative, pigment intermediate, colorant derivative, and colorant intermediate is deleted even if it is an acid group due to the reaction with the carbodiimide group contained in the carbodiimide compound. Therefore, when the compound is used as a pigment dispersion-based resist composition for color filters and black matrices, the problem that the liquid crystal display screen is defaced as a result of bleeding of a pigment derivative, pigment intermediate, colorant derivative or colorant intermediate during the alkaline development can be prevented.

In this specification, the pigment derivative and colorant intermediate having a functional group reactive with a carbodiimide group and having adsorption ability on the pigment surface are sometimes referred to as coloring material derivatives later herein. In addition, the pigment intermediate and colorant intermediate having a functional group reactive with a carbodiimide group and having adsorption ability on the pigment surface are sometimes referred to as coloring material intermediate later herein.

First, the pigment which can be used in the practice of the present invention is described.

As the pigment which can be used in the practice of the present invention, there may be mentioned, for example, carbon black and organic pigments such as dye chelate pigments, azo pigments, benzimidazolone pigments, phthalocyanine pigments, quinacridone pigments, anthraquinone pigments, dioxazine pigments, indigo pigments, thioindigo pigments, perylene pigments, perinone pigments, diketopyrrolopyrrole pigments, isoindolinone pigments, nitro pigments, nitroso pigments, anthraquinone pigments, flavanthrone pigments, quinophthalone pigments, pyranthrone pigments, and indanthrone pigments. These may be used alone or two or more of them may be used in combination.

The pigment derivative, pigment intermediate, colorant derivative and colorant intermediate each having a functional group reactive with a carbodiimide group and having adsorption ability on the pigment surface which can be used in the practice of the invention are appropriately selected according to the species of the pigment to be used. Preferred pigment derivative is a molecular derivative of the above pigment which can be used in the invention, and there may be mentioned a compound having a functional group reactive with a carbodiimide group. Moreover, preferred pigment intermediate is a compound used in synthesizing a pigment, and there may be mentioned, for example, naphthoic acid and a compound having a functional group reactive with a carbodiimide group such as 2-carboxypyrazine represented by the following formula (1). The colorant derivative is a derivative of a molecule such as dye, etc., and there may be mentioned, for example, a compound having a functional group reactive with a carbodiimide group such as a β-naphthol orange dye derivative, etc. The colorant intermediate is a compound used in synthesizing a dye, etc., and there may be mentioned a colorant residue, etc. having a functional group reactive with a carbodiimide group and an adsorption part, such as an anthraquinone derivative, etc. disclosed in Japanese Kokai Publication 2002-22922.

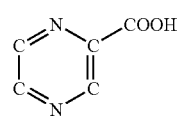
(1)

These may be used alone or two or more of them may be used in combination.

The functional group reactive with a carbodiimide group contained in the above coloring material derivative and coloring material intermediate preferably contains at least one functional group selected from the group consisting of a carboxyl group, sulfonic acid group, phosphoric acid group, hydroxyl group and amino group, and more preferably contains at least one functional group selected from the group consisting of a carboxyl group, sulfonic acid group and phosphoric acid group.

Particularly, an effective pigment for the above coloring material derivative and coloring material intermediate is (1) a pigment which does not contain a functional group reactive with a carbodiimide group (in the case where a covalent bonding is not utilized), and (2) a pigment which, even is a pigment having a functional group reactive with a carbodiimide group, contains the functional group reactive with a carbodiimide group contained in the above pigment of e.g. an amino group, hydroxyl group, etc. and has a temperature reacting with a carbodiimide group of 100° C. or more (in the case where a covalent bonding is utilized).

The above-mentioned pigment derivative, pigment intermediate, colorant derivative and colorant intermediate are preferably used in combination with a pigment having the same or similar molecular structure. However, even in the case of a pigment derivative, etc. having a molecular structure different from the pigment to be used, one having a sufficient adsorption ability on the pigment surface can be used. As such preferable combination of the pigment derivative, pigment intermediate, colorant derivative and colorant intermediate with a pigment, there may be mentioned, for example, (1) a phthalocyanine pigment derivative as the pigment derivative can be combinedly used, as a pigment, with Pigment black 7 in addition to a phthalocyanine pigment, (2) a β-naphthol orange dye derivative as the colorant derivative can be combinedly used, as a pigment, with a condensed azo pigment in addition to a naphthol pigment, and (3) an anthraquinone derivative as the colorant intermediate can be combinedly used, as a pigment, with a diketopyrrolopyrrole pigment, condensed azo pigment, isoindolinone pigment, perinone pigment, azo pigment containing a heterocycle, quinacridone pigment, dibromoanthanethrone pigment and/or benzimidazolone pigment in addition to a dianthraquinonyl pigment.

Next, the carbodiimide compound which can be used in the present invention is described.

The carbodiimide compound is a carbodiimide compound containing at least one carbodiimide group, i.e. —N=C=N— within the molecule. Such carbodiimide compound may be used alone or two or more of them may be used in combination.

As a general method of obtaining such carbodiimide compound containing one or more carbodiimide groups, there may be mentioned a method comprising subjecting an isocyanate compound to decarboxylation for carbodiimide group formation in an organic solvent in the presence of a carbodiimide formation catalyst.

As the above-mentioned isocyanate compound, there maybe mentioned monoisocyanate compounds such as methyl isocyanate, ethyl isocyanate, propyl isocyanate, butyl isocyanate, octadecyl isocyanate, and phenyl isocyanate; aliphatic, alicyclic, aromatic or araliphatic diisocyanate compounds such as hexamethylene diisocyanate, isophoronediisocyanate, tolylene diisocyanate, diphenylmethanediisocyanate, cyclohexanediisocyanate, dicyclohexylmethanediisocyanate, xylylene diisocyanate, tetramethylene diisocyanate, and tetramethylxylylene diisocyanate.

The organic solvent which is utilizable is one having a high boiling point and having no active hydrogen atom reactive with the isocyanate compound or the carbodiimide group-containing compound formed. Specifically, there may be mentioned aromatic hydrocarbons such as toluene, xylene and diethylbenzene; glycol ether esters such as diethylene glycol diacetate, dipropylene glycol dibutyrate, hexylene glycol diacetate, glycol diacetate, methylglycol acetate, ethylglycol acetate, butylglycol acetate, ethyldiglycol acetate and butyldiglycol acetate; ketones such as ethyl butyl ketone, acetophenone, propiophenone, diisobutyl ketone and cyclohexanone; and aliphatic esters such as amyl acetate, propyl propionate, ethyl butyrate, and the like.

Utilizable as the carbodiimide formation catalyst are phospholenes, phospholene oxides and so forth. As specific examples, there may be mentioned 1-ethyl-3-methyl-3-phospholene oxide, 1-phenyl-3-methyl-3-phospholene oxide, 1-phenyl-3-methyl-2-phospholene oxide, and the like.

In carrying out the isocyanate group-involving decarboxylation reaction using these materials, use may be made of any of the methods known in the art. Thus, for example, the reaction can be carried out in a nitrogen atmosphere at a reaction temperature of 100 to 200° C.

As other methods for obtaining the carbodiimide group-containing compounds mentioned above, there may be mentioned the methods described in U. S. Pat. No. 2,941,956, Japanese Patent Publication Sho-47-33279, Japanese Kokai Publication Hei-05-178954, Japanese Kokai Publication Hei-06-56950, and the like.

Those compounds obtained by using such a method, for example by decarboxylation of K ($\geqq$2) moles of a diisocyanate compound, can be represented by the general formula (2-1) given below.

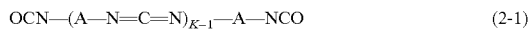

OCN—(A—N=C=N)$_{K-1}$—A—NCO  (2-1)

And those compounds obtained by decarboxylation of 2 moles of monoisocyanate compound and L($\geqq$0) moles of a diisocyanate compound can be represented by the general formula (2-2) given below (when L=0 mole, only a monoisocyanate compound is reacted).

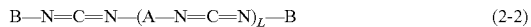

B—N=C=N—(A—N=C=N)$_L$—B  (2-2)

In the above general formulas (2-1) and (2-2), A is the residue derived from the diisocyanate compound used for the synthesis of the carbodiimide compounds by removal of the isocyanate groups, and B is the residue derived from the monoisocyanate compound used for the synthesis of the carbodiimide compounds by removal of the isocyanate group.

Such carbodiimide compound is one of the simplest structures which can be used as the carbodiimide compound of the invention.

As commercial grades of the carbodiimide compounds mentioned above, there may be mentioned Lupranate MM-103, XTB-3003 (all being product names, manufactured by BASF), Stabaczole P (product name, manufactured by Sumitomo Bayer Urethane Co., Ltd.), which are mono-carbodiimide compounds derived from diphenylmethane diisocyanate as a starting material, Carbodilite V-03, V-05, etc. (all being product names, manufactured by Nisshinbo Industries, Inc.), which are polycarbodiimides derived from tetramethylxylylene diisocyanate as a starting material.

The carbodiimide compounds represented by the above formula (2-1) have isocyanate groups within the molecule thereof and can also be reacted with a compound having a functional group reactive with the isocyanate group.

A carbodiimide compound obtainable by reacting the isocyanate group of such carbodiimide compound with a compound having a functional group reactive with the isocyanate group can also be used as the carbodiimide compound of the invention.

Preferred as the above compounds having a functional group reactive with the isocyanate group are compounds low in reactivity with the remaining carbodiimide group and capable of selectively reacting first with an isocyanate group, including hydroxyl group-containing compounds, for example low-molecular-weight monohydric alcohol compounds such as methanol and ethanol, hydroxyl group-containing polyester compounds, hydroxyl group-containing polyether compounds, polyalkylene glycols and monoalkyl ester compounds derived therefrom, polymethyl methacrylate diol, polybutyl methacrylate diol, poly-2-ethylhexyl methacrylate diol, and like hydroxyl group-containing polyacrylic compounds.

Preferred among them are those capable of forming polyester chains, polyether chains and polyacrylic chains having a formula weight of 500 to 5,000.

The carbodiimide compound of the invention preferably has a side chain within the molecule, and further those having a carbodiimide group equivalent of 100 to 50,000 are suitably used.

Preferred as the above side chain is at least one side chain selected from the group consisting of a polyester side chain, polyether side chain and polyacrylic side chain.

The term "side chain" as used herein means a chain branching off from the main chain, which is the carbodiimide compound proper.

When at least one polyester chain and at least one polyether chain are combined in one side chain, the side chain thus formed belongs to both categories of "polyester side chain" and "polyether side chain". When at least one polyester chain and at least one polyacrylic chain are combined in one side chain, the side chain thus formed belongs to both categories of "polyester side chain" and "polyacrylic side chain" and, when at least one polyether chain and at least one polyacrylic chain are combined in one side chain, the side chain thus formed belongs to both categories of "polyether side chain" and "polyacrylic side chain". Further, when at least one polyester chain, at least one polyether chain and at least one polyacrylic chain are combined, the side chain thus formed belongs to all the categories of "polyester side chain", "polyether side chain" and "polyacrylic side chain". Such side chains in which a polyester chain and/or a polyether chain and/or a polyacrylic chain occur in admixture each of course is a side chain satisfying the requirement "having at least one side chain selected from the group consisting of polyester side chains, polyether side chains and polyacrylic side chains".

Most preferably, carbodiimide compounds resulting from intramolecular introduction of at least one side chain selected from the group consisting of a polyester chain, polyether chain and polyacrylic chain by utilizing the reaction of the carbodiimide group contained in the carbodiimide compound with a functional group reactive therewith can be utilized as the above side chain-containing carbodiimide compound.

In the present specification, the reaction between a carbodiimide group and such a functional group reactive with a carbodiimide group is sometimes referred to as "grafting reaction", and the thus-introduced side chain as "grafted side chain". The polyester side chain thus introduced is sometimes referred to as "grafted polyester side chain", the polyether side chain thus introduced as "grafted polyether side chain", and the polyacrylic side chain thus introduced as "grafted polyacrylic side chain".

The term "carbodiimide equivalent" as used herein means the number given by the expression (molecular weight of carbodiimide compound)/(number of carbodiimide groups in each carbodiimide compound molecule).

As the carbodiimide compound having such a grafted side chain(s) as mentioned above, there may first be mentioned carbodiimide compounds derived from carbodiimide compounds having two or more carbodiimide groups in each molecule by addition of at least one side chain selected from the group consisting of polyester side chains, polyether side chains and polyacrylic side chains by the grafting reaction (provided that at least one carbodiimide group should remain).

Utilizable as the compound having two or more carbodiimide groups are, for example, compounds represented by the above general formula (2-1) (provided that K≧3) obtained by decarboxylation of 3 or more moles of a diisocyanate compound, and compounds represented by the above general formula (2-2) (provided that L≧2) obtained by decarboxylation of 2 moles of monoisocyanate compound and 1 or more mole of a diisocyanate compound. These are also called polycarbodiimide compounds.

Moreover, as the compounds having two or more carbodiimide groups, carbodiimide compounds obtained from the isocyanate group of the compound represented by the above general formula (2-1) (provided that K≧3) and the compound having a functional group reactive with the isocyanate group can also be used.

A polyester side chain, polyether side chain and/or polyacrylic side chain is further introduced, by the grafting reaction, into the compounds having two or more carbodiimide groups within the molecule as obtained by using such a method as mentioned above to give carbodiimide compounds containing, within the molecule thereof, at least one carbodiimide group and at least one grafted side chain selected from the group consisting of grafted polyester side chains, grafted polyether side chains and grafted polyacrylic side chains.

Utilizable as a typical method of introducing such side chains into the molecule by the grafting reaction is the method which comprises reacting a polyester compound, polyether compound or polyacrylic compound having a functional group reactive with a carbodiimide group, for example a carboxyl group, sulfonic acid group, phosphoric acid group, hydroxyl group or amino group, with a carbodiimide group of a carbodiimide group-containing polycarbodiimide compound.

As the above polyester compound having a functional group reactive with a carbodiimide group, there may first be mentioned (1) compounds obtained by ring-opening polymerization of cyclic ester compounds using a hydroxycarboxylic acid, monohydric alcohol, low-molecular-weight diol compound or the like as an initiator (e.g. polyester compounds having a carboxyl group and a hydroxyl group as obtained by ring-opening polymerization of cyclic ester compounds such as ε-caprolactone, γ-butyrolactone, 2-methylcaprolactone, 4-methylcaprolactone, β-propiolactone, δ-valerolactone and β-methyl-δ-valerolactone using, as an initiator, a mono- or polyhydroxycarboxylic acid such as lactic acid, caproic acid, 12-hydroxystearic acid, dimethylolpropionic acid or dimethylolbutanoic acid; hydroxyl group-containing polyester monool compounds obtained by ring-opening polymerization of the cyclic ester compounds mentioned above using, as an initiator, a low-molecular-weight monool compound such as methanol or ethanol; hydroxyl group-containing polyester diol compounds obtained by ring-opening polymerization of the cyclic ester compounds mentioned above using, as an initiator, a low-molecular-weight diol compound such as ethylene glycol or propylene glycol).

Further, there may be mentioned (2) compounds obtained by self-polycondensation of hydroxycarboxylic acids (e.g. polyester compounds containing a carboxyl group and a hydroxyl group as obtained by polycondensation of monohydroxycarboxylic acids such as lactic acid, caproic acid and 12-hydroxystearic acid).

There may further be mentioned (3) compounds obtained by polycondensation of low-molecular-weight diol compounds and low-molecular-weight dicarboxylic acid compounds (e.g. hydroxyl group-containing polyester diol compounds obtained by reacting a low-molecular-weight diol compound component, for example a linear glycol such as ethylene glycol, 1,3-propanediol, 1,4-butanediol or 1,6-hexanediol or a branched glycol such as 1,2-propanediol, neopentyl glycol, 3-methyl-1,5-pentanediol or ethylbutylpropanediol, with a low-molecular-weight dicarboxylic acid component, for example a saturated or unsaturated aliphatic dicarboxylic acid such as succinic acid, adipic acid, azelaic acid, sebacic acid or maleic acid or an aromatic dicarboxylic acid such as phthalic acid in the presence of an excess of the low-molecular-weight diol compound).

There may also be mentioned (4) phosphate ester compounds derived from products of ring-opening polymerization of cyclic ester compounds using a monohydric alcohol as an initiator (e.g. phosphoric acid group-containing polyester diol compounds obtained by esterification of the polyester monool compounds mentioned above with phosphoric acid), and (5) compounds obtained by ring-opening polymerization of cyclic ester compounds using an amino group-containing sulfonic acid compound as an initiator (e.g. sulfonic acid group-containing polyester diol compounds obtained by ring-opening polymerization of the cyclic ester compounds using taurine or a like amino group-containing sulfonic acid compound as an initiator).

There may further be mentioned (6) sulfurous acid gas adducts derived from products of ring-opening polymerization of cyclic ester compounds using a monohydric alcohol as an initiator (e.g. sulfonic acid group-containing polyester diol compounds obtained by addition of sulfurous acid gas to the above-mentioned polyester monool compounds).

Among such polyester compounds, those polyester compounds obtained by ring-opening polymerization of polycaprolactone are preferred.

As the polyether compound having a functional group reactive with a carbodiimide group, there may first be mentioned (1) compounds obtained by ring-opening polymerization of cyclic ether compounds using a hydroxycarboxylic acid, monohydric alcohol, low-molecular-weight diol compound or the like as an initiator (e.g. polyether compounds having a carboxyl group and a hydroxyl group as obtained by ring-opening polymerization of cyclic ether compounds such as ethylene oxide, propylene oxide, trimethylene oxide, tetrahydrofuran and tetrahydropyran using, as an initiator, a mono- or polyhydroxycarboxylic acid such as lactic acid, caproic acid, 12-hydroxystearic acid, dimethylolpropionic acid or dimethylolbutanoic acid; hydroxyl group-containing polyether monool compounds obtained by ring-opening polymerization of the cyclic ether compounds mentioned above using, as an initiator, a low-molecular-weight monool compound such as methanol or ethanol; hydroxyl group-containing polyether diol compounds obtained by ring-opening polymerization of the cyclic ether compounds mentioned above using, as an initiator, a low-molecular-weight diol compound such as ethylene glycol or propylene glycol).

There may also be mentioned (2) phosphate ester compounds derived from products of ring-opening polymerization of cyclic ether compounds using a monohydric alcohol as an initiator (e.g. phosphoric acid group-containing polyether compounds obtained by esterification of the polyether monool compounds mentioned above with phosphoric acid).

Further, there may be mentioned (3) compounds obtained by ring-opening polymerization of cyclic ether compounds using an amino group-containing sulfonic acid compound as an initiator (e.g. sulfonic acid group-containing polyether compounds obtained by ring-opening polymerization of the cyclic ether compounds using taurine or a like amino group-containing sulfonic acid compound as an initiator).

There may further be mentioned (4) sulfurous acid gas adducts derived from products of ring-opening polymerization of cyclic ether compounds using a monohydric alcohol as an initiator (e.g. sulfonic acid group-containing polyether compounds obtained by addition of sulfurous acid gas to the above-mentioned polyether monool compounds).

As the above-mentioned polyacrylic compound having a functional group reactive with a carbodiimide group, there may be mentioned (meth)acrylic polymers obtained by polymerization of a monomer composition comprising at least one monomer selected from among (meth)acrylic monomers having at least one group selected from the group consisting of a carboxyl group, sulfonic acid group, phosphoric acid group, hydroxyl group and amino group (e.g. (meth)acrylic polymers obtained by polymerization of at least one monomer component selected from among such monomers as carboxyl group-containing (meth)acrylic monomers: (meth)acrylic acid, crotonic acid, maleic acid, fumaric acid, citraconic acid, itaconic acid, etc.; sulfonic acid group-containing (meth)acrylic monomers: sulfoethyl (meth)acrylate, sulfopropyl(meth)acrylate, etc.; phosphoric acid group-containing (meth)acrylic monomers: 2-methacryloyloxyethyl acid phosphate, tris(acryloyloxyethyl) phosphate, etc.; hydroxyl group-containing (meth)acrylic monomers: (meth)acrylic acid hydroxyalkyl esters such as 2-hydroxyethyl(meth)acrylate, hydroxypropyl(meth)acrylate and hydroxypentyl(meth)acrylate; amino group-containing (meth)acrylic monomers: (meth)acrylamide, N-methyl(meth)acrylamide, N-ethyl(meth)acrylamide, N-propyl(meth)acrylamide, N-butyl(meth)acrylamide, N-hexyl(meth)acrylamide, N-octyl(meth)acrylamide, etc., if necessary together with one or more of known monomers (other than the above-mentioned monomers) generally used as monomer components for acrylic resins, for example alkyl esters and styrenic monomers).

Furthermore, those compounds which have the functional group defined above and contains both a polyester chain and a polyether chain, those polyacrylic compounds which have the functional group defined above and a polyester chain, and those polyacrylic compounds which have the functional group defined above and a polyether chain may also be used. Thus, usable are, for example, compounds obtained by reacting cyclic ester compounds with a polyalkylene glycol or a monoalkyl ether compound derived therefrom, which is used as an initiator, compounds obtained by reacting hydroxyl group-containing polyester compounds with a cyclic ether compound, and polyacrylic chain compounds obtained by using (meth)acrylic monomers containing a polyester chain within the molecule or (meth)acrylic monomers containing a polyether chain within the molecule.

Those polyester compounds, polyether compounds and polyacrylic compounds which contain a carboxyl group, sulfonic acid group or phosphoric acid group are advantageous from the viewpoint of reactivity with a carbodiimide group.

In cases where the polycarbodiimide compound to serve as a basis further has at least one isocyanate group, when the hydroxyl group-containing compounds are used as the compound having a functional group reactive with a carbodiimide group, the hydroxyl group-containing compounds react with the isocyanate group earlier than with the carbodiimide group(s), whereby it becomes difficult to control the reaction. Furthermore, when those compounds having two or more hydroxyl groups are used as the compound having a functional group reactive with a carbodiimide group, gelation may occur as a result of crosslinking during a grafting reaction.

Therefore, with those compounds which contain hydroxyl groups alone as the functional groups reactive with a carbodiimide group, it is desirable that they be further reacted with an acid anhydride such as phthalic anhydride, maleic anhydride or succinic anhydride to give compounds having one carboxyl group and such compounds be subjected to grafting reaction.

The compounds resulting from intramolecular introduction of at least one of the polyester compounds, polyether compounds or polyacrylic compounds enumerated hereinabove are further required to have at least one carbodiimide group. For example, when a side chain is introduced, by grafting reaction, into a polycarbodiimide compound represented by the general formula (2-1) (provided that K≧3) given hereinabove, a carbodiimide compound represented by the following general formula (3) can be obtained (provided that K−1=m+n).

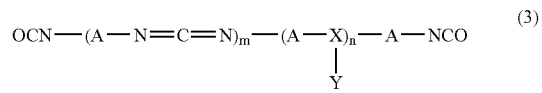

(3)

In the above formula, A is the residue derived from the diisocyanate compound used in synthesizing the polycarbodiimide compound by removal of isocyanate groups. X's are the same or different and each is a trivalent linking group resulting from the reaction of the carbodiimide group with a functional group reactive therewith, Y's are the same or different and each is a polyester chain, polyether chain or polyacrylic chain, and m and n each represents an integer of not smaller than 1.

As for the trivalent linking group represented by X in the above formula, for instance, the linking group formed by the reaction between a carbodiimide group and a carboxyl group is represented by the general formula (4) or (5) given below, the linking group formed by the reaction between a carbodiimide group and a hydroxyl group by the general formula (6) or (7) given below, the linking group formed by the reaction between a carbodiimide group and an amino group by the general formula (8) given below, the linking group formed by the reaction between a carbodiimide group and a sulfonic acid group by the general formula (9) given below, and the linking group formed by the reaction between a carbodiimide group and a phosphoric acid group by the general formula (10) given below.

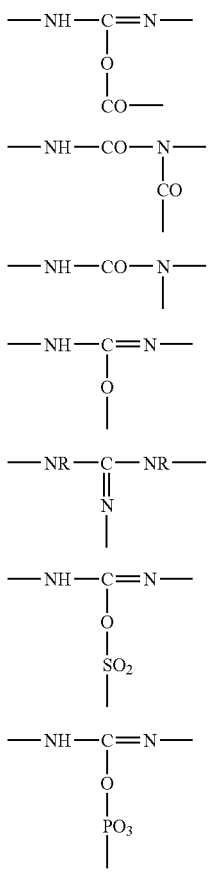

(4)
(5)
(6)
(7)
(8)
(9)
(10)

In the above general formulas, R represents a hydrogen atom or a hydrocarbon group containing at least one carbon atoms.

Furthermore, it is also possible to react the carbodiimide compound represented by the general formula (3), which has isocyanate groups within the molecule, with a compound having a functional group reactive with an isocyanate group. Thus, the carbodiimide compounds represented by the general formula (11) given below thus obtained can also be utilized as the carbodiimide group-containing carbodiimide compound in the practice of the invention.

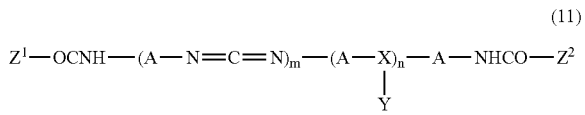

(11)

In the above general formula, $Z^1$ and $Z^2$ each independently represents the residue resulting from removal of said functional group of the isocyanate group-reactive functional group-containing compound, which may be different in structure. A is the residue resulting from removal of isocyanate groups from the diisocyanate compound used for the synthesis of the polycarbodiimide compound. X's are the same or different and each is a trivalent linking group resulting from the reaction of the carbodiimide group with the functional group reactive therewith, Y's are the same or different and each is a polyester chain, polyether chain or polyacrylic chain, and m and n each represents an integer of not smaller than 1.

Preferred as such isocyanate group-reactive functional group-containing compound are, as described for the compounds represented by the general formula (2-1), compounds low in reactivity with the remaining carbodiimide group and selectively reacting first with an isocyanate group, including, for example, low-molecular-weight monohydric alcohol compounds such as methanol and ethanol, hydroxyl group-containing polyester compounds, hydroxyl group-containing polyether compounds, polyalkylene glycols and monoalkyl ester compounds derived therefrom, hydroxyl group-containing polyacrylic compounds such as polymethyl methacrylate diol, polybutyl methacrylate diol and poly-2-ethylhexyl methacrylate diol, and like hydroxyl group-containing compounds.

Preferred among them are ones forming a polyester chain, polyether chain or polyacrylic chain with a formula weight of 500 to 5,000.

In carrying out the reactions mentioned above, namely the above-mentioned ring-opening reaction of cyclic ester compounds using a hydroxyl group-containing compound as an initiator, polycondensation reaction of hydroxycarboxylic acids, polycondensation reaction of low-molecular-weight diol compounds with low-molecular-weight dicarboxylic acid compounds, ring-opening reaction of hydroxyl group-containing ester compounds with acid anhydrides, ring-opening reaction of cyclic ether compounds, ring-opening reaction of hydroxyl group-containing ether compounds with acid anhydrides, reaction of a carbodiimide group with a carboxyl, hydroxyl or the like group and, further, reaction of an isocyanate group with a hydroxyl group, and the like, the conventional methods can be utilized.

The above-mentioned side chain-containing carbodiimide compound may be any of carbodiimide compounds having at least one carbodiimide group and at least one of grafted polyester chain, grafted polyether chain and grafted polyacrylic chain. Even when the order of reactions of the respective reactants is changed, the carbodiimide compound finally obtained has the same molecular structure, the performance characteristics obtainable do not differ.

Therefore, referring to the compounds of the above general formula (11), for introducing a grafted side chain, the method has been described in the above which comprises synthesizing a polyester compound having a functional group such as a carboxyl group, a polyether compound having a functional group such as a carboxyl group, or a polyacrylic compound having a functional group such as a carboxyl group, and then reacting the resulting compound with a carbodiimide group to produce a side chain. As an alternative method for introducing a grafted side chain, there may be mentioned a method comprising reacting a compound containing a group bonding a functional group reactive with a carbodiimide group and a polymer chain with a carbodiimide group, and then introducing a compound forming at least one species selected from the group consisting of a polyester chain, polyether chain, and polyacrylic chain within the molecule to introduce a side chain.

In the case of introduction of a grafted polyester side chain or grafted polyether side chain, for instance, use may be made of the method which comprises first reacting a hydroxycarboxylic acid with a carbodiimide group for intramolecular introduction of a hydroxyl group into the polycarbodiimide compound and then subjecting a cyclic polyester compound or cyclic polyether compound to ring-opening polymerization for graft bonding of a polyester chain or polyether chain. In the case of introduction of a grafted polyacrylic chain, use may be made of the method which comprises first reacting a hydroxycarboxylic acid with a carbodiimide group for intramolecular introduction of a hydroxyl group into the polycarbodiimide compound and then carrying out graft bonding of a polyacrylic chain.

Furthermore, an isocyanate group contained in the molecule of a polycarbodiimide compound may be first reacted with such a functional group reactive with the isocyanate group as mentioned above, followed by grafting. As for the order of these reactions, it is desirable that the synthesis be carried out under conditions such that the formation of unfavorable side reaction products may be minimized.

As another example of the carbodiimide compound having a grafted polyester chain, grafted polyether chain and/or grafted polyacrylic chain within the molecule, there may be mentioned the compound obtained by the method described below from the carbodiimide compound represented by the above general formula (2-1) (provided that K≧2) and a compound represented by the general formula (12) given below as derived by introduction of a grafted polyester chain, grafted polyether chain or grafted polyacrylic chain into each carbodiimide group.

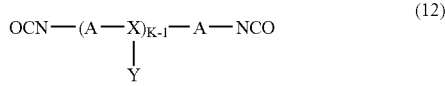
(12)

In the above general formula, X, Y, Z, A and K are respectively as defined above.

First, one of the carbodiimide compounds of general formula (2-1) (provided that K≧2) or of general formula (12) is used, and the isocyanate groups on both ends are reacted with a diol compound to give a compound having a hydroxyl group at each terminus. For example, the compound obtained by reacting 1 mole of the carbodiimide compound of general formula (2-1) (provided that K≧2) with 2 moles of a diol compound is represented by the general formula (13) given below, while the compound obtained by reacting 1 mole of a compound of general formula (12) with 2 moles of a diol compound is represented by the general formula (14) given below.

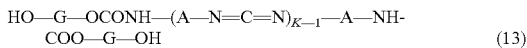
(13)

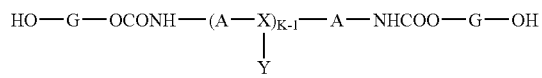
(14)

In the above general formulas, G represents the diol compound residue resulting from removal of the hydroxyl group.

And, the carbodiimide compounds obtained by reacting the above-mentioned carbodiimide group-containing diol compound (compound represented by the general formula (13)) with a diisocyanate compound having a grafted polyester chain, grafted polyether chain or grafted polyacrylic chain (compound represented by the general formula (12)) or, conversely, reacting a diol compound having such a graft side chain (compound represented by the general formula (14)) with a carbodiimide group-containing diisocyanate compound (carbodiimide compound represented by the general formula (2-1) (provided that K≧2)) can be utilized as the carbodiimide compound in the practice of the invention.

The compounds represented by the general formula (3) or (11) are advantageous in that they can be obtained under relatively simple and unsophisticated synthesis conditions. However, when one polyester chain, polyether chain or polyacrylic chain is subjected to grafting, by the grafting reaction, onto a compound having a small number of carbodiimide groups within the molecule, for example a polycarbodiimide compound having two carbodiimide groups in each molecule, a byproduct having no grafted polyester chain, grafted polyether chain, or grafted polyacrylic chain within the molecule (containing two carbodiimide groups) and a byproduct having these two grafted side chains within the molecule (containing no carbodiimide group) are both formed according to the probabilities of the respective reactions.

If the compound having two of grafted polyester chains, grafted polyether chains, or grafted polyacrylic chains within the molecule is formed abundantly in such a case, it becomes difficult to achieve the effects of the present invention. Therefore, it is desirable, for example, that the carbodiimide compound for use in the practice of the present invention be synthesized under conditions such that the grafted polyester chain, grafted polyether chain, or grafted polyacrylic chain can be obtained in an average proportion of about 0.7 per molecule, to thereby cause abundant formation of a mixture of the compound containing one such grafted side chain within the molecule and the compound containing no grafted side chain.

On the other hand, those compounds obtained by reacting a compound represented by the general formula (12) with a compound represented by the general formula (13) and those compounds obtained by reacting a carbodiimide compound represented by the general formula (2-1) (provided that K≧2) with a compound represented by the general formula (14) having a polyester chain, polyether chain or polyacrylic chain as a side chain, and the like, are advantageous in that they are obtained as carbodiimide compounds having at least one such side chain and at least one carbodiimide group within the molecule. For the synthesis thereof, however, it is necessary to establish sufficient synthesis conditions, for example the temperature for the reaction between the isocyanate group and hydroxyl group, in advance.

Furthermore, it is also possible to obtain carbodiimide compounds having such a side chain from other combinations, for example by utilizing monocarbodiimide compounds or compounds derived from monocarbodiimide compounds by introduction of a grafted polyester chain, grafted polyether chain or grafted polyacrylic chain as substitutes for the polycarbodiimide compounds or components to be used in combination.

The above carbodiimide compound is obtainable by a method comprising the introduction of a side chain by utilizing a grafting reaction. Additionally, utilizable further as the method of side chain introduction into carbodiimide compounds other than the method involving a grafting reaction is, for example, the method which comprises subjecting a carbodiimide compound represented by the general formula (2-1) (provided that K≧2) to chain extension using a chain extender having a polyester chain, polyether chain or polyacrylic chain.

Such chain extenders include such polyester-chain-containing ones as compounds obtained by ring-opening polymerization of the above-mentioned cyclic polyester compound on a polyol compound having three or more hydroxyl groups, for example trimethylolpropane or pentaerythritol, compounds obtained by polycondensation of the above-mentioned low-molecular-weight dicarboxylic acid and the above-mentioned low-molecular-weight diol compound partly in combination with a triol compound, and compounds obtained by reacting a diol monocarboxylic acid, such as dimethylolpropionic acid, with an epoxy compound having a polyester chain within the molecule. As polyether chain-containing ones, there may be mentioned compounds obtained by ring-opening polymerization of the above-mentioned cyclic polyether compound on the above-mentioned polyol compound, and the like. As polyacrylic chain-containing ones, there may be mentioned compounds obtained by reacting the above-mentioned polyol compound with a carboxyl group-containing (meth)acrylic polymer, and the like.

In the above-mentioned carbodiimide compounds, the polyester chain, polyether chain or polyacrylic chain to be introduced as a side chain is not particularly restricted but may be any of those which are effective in improving the dispersion stability of pigments in a dispersion medium. Preferably, it has a formula weight (number average molecular weight) of not less than 200 but not more than 10,000, more preferably not less than 300 but not more than 5,000.

The carbodiimide compound of the invention preferably has a carbodiimide equivalent of 100 to 50,000, and more preferably not less than 200 but not more than 10,000. If the carbodiimide equivalent is excessively high, the dispersion stability of the pigments in a dispersion medium may decrease since the amount of the side chain having pigment adsorption ability which is to be introduced into the carbodiimide compound becomes decrease. On the other hand, compounds having low carbodiimide equivalent are advantageous for capable of enhancing adsorption ability with the pigment surface by increasing the number of side chains having pigment adsorption ability but the dispersion stability of the pigments in a dispersion medium may decrease.

The carbodiimide compound or carbodiimide-based compound introduced with a side chain having pigment adsorption ability within the molecule preferably has a number average molecular weight of not less than 1,000 but not more than 100,000, more preferably not less than 1,000 but not more than 50,000. When the number average molecular weight is excessively high, it becomes difficult for dispersions prepared by dispersing a pigment in a dispersion medium and pigment dispersion compositions prepared therefrom to have an appropriate level of viscosity, and this is unfavorable in particular when a high-concentration pigment dispersion composition is required. On the other hand, when the number average molecular weight is excessively low, the dispersion stability of the pigments in a dispersion medium unfavorably decreases.

As the method of dispersing the pigment using at least one species selected from the group consisting of the above-mentioned pigment derivatives, pigment intermediates, colorant derivatives and colorant intermediates, and the above-mentioned carbodiimide compound, preferred is (1) a method using a mixture comprising at least one species selected from the group consisting of the above-mentioned pigment derivatives, pigment intermediates, colorant derivatives and colorant intermediates, and the above-mentioned carbodiimide compound, or (2) a method using a carbodiimide-based compound introduced with a side chain having pigment adsorption ability within the molecule by reacting the above-mentioned carbodiimide compound with at least one species selected from the group consisting of the above-mentioned pigment derivatives, pigment intermediates, colorant derivatives and colorant intermediates each having a functional group reactive with a carbodiimide group in advance.

The pigment dispersion composition prepared by dispersing the pigment in a dispersion medium using the above method (1) is considered to give preferable fluidity and dispersion stability since the above coloring material derivatives and coloring material intermediates are relatively low in the molecular weight, thus are rapidly adsorbed on the pigment surface at the stage of dispersing the pigment, and further can form a thick adsorption layer on the pigment surface by reacting with a carbodiimide group in the carbodiimide compound. However, the coloring material derivative and coloring material intermediate to be used are necessary to react with a carbodiimide group, and since the reaction occurs at low temperatures, the functional group reactive with a carbodiimide group contained in the coloring material derivative and coloring material intermediate preferably has any of a carboxyl group, sulphonic acid group or phosphoric acid group.

Moreover, the pigment dispersion composition prepared by dispersing the pigment in a dispersion medium by the above method (2) is considered to provide preferable fluidity and dispersion stability since the side chain having pigment adsorption ability occuring in the molecule of the above carbodiimide-based compound is adsorbed to the pigment, and can form a thick adsorption layer on the pigment surface by the molecular weight effect of the carbodiimide-based compound.

In this specification, "the carbodiimide-based compound" refers to a compound obtainable by the introduction of the above side chain having pigment adsorption ability using a carbodiimide group-containing compound as a basis, and includes, needless to say, ones containing a carbodiimide group, and also includes ones having no carbodiimide group within the molecule of the compound finally obtained.

Furthermore, in the case where the carbodiimide compound contains at least one side chain selected from the group consisting of polyester side chains, polyether side chains, and poly acrylic side chains, it is considered that, when the pigment is dispersed in a dispersion medium, the pigment can be stably dispersed in a dispersion medium since said side chain forms domain in the dispersion medium to act as steric hindrance, and the like.

In addition, among the above-mentioned preferable modes, as the carbodiimide-based compound used in the method (2), it is possible to use a carbodiimide-based compound obtainable by reacting the carbodiimide group of the carbodiimide compound with at least one species selected from the group consisting of the above-mentioned pigment derivatives, pigment intermediates, colorant derivatives, and colorant intermediates each having a functional group reactive with a carbodiimide group in advance, and then introducing at least one side chain selected from the group consisting of polyester side chains, polyether side chains, and poly acrylic side chains.

In either the above method (1) or (2), as for the pigment dispersion composition finally obtained, since at least one species selected from the group consisting of the above-mentioned pigment derivatives, pigment intermediates, colorant derivatives, and colorant intermediates is reacted with a carbodiimide compound, use of this pigment dispersion composition in resist for color filters, etc. can prevent bleeding of the pigment derivative, pigment intermediate, colorant derivative and colorant intermediate on a liquid crystal display screen.

In the present invention, the proportion of at least one species selected from the group consisting of the above-mentioned pigment derivatives, pigment intermediates, colorant derivatives and colorant intermediates, with the carbodiimide compound to be used preferably satisfies the condition that at least one species selected from the group consisting of the above-mentioned pigment derivatives, pigment intermediates, colorant derivatives, and colorant intermediates are all introduced into the molecule of the carbodiimide compound by the reaction of the functional group reactive with a carbodiimide group and a carbodiimide group. The proportion is appropriately selected and adjusted mainly according to the species and amount of the above pigments, the species of the dispersion medium to be used, and required characteristics of the applied field.

The dispersion medium in the present invention is appropriately selected according to the applications, desired physical properties, etc. of the pigment dispersion composition. As examples of the dispersion medium adequately utilized in the field of inks or paints, there may be mentioned, among organic dispersion media, (poly)alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether and propylene glycol monoethyl ether; (poly)alkylene glycol monoalkyl ether acetates such as ethylene glycol monomethyl ether acetate, ethylene glycol monoethyl ether acetate and propylene glycol monomethyl ether acetate; ethers such as diethylene glycol diethyl ether, diethylene glycol methyl ethyl ether and tetrahydrofuran; ketones such as methyl ethyl ketone, methyl isobutyl ketone, cyclohexanone, 2-heptanone and 3-heptanone; lactic acid alkyl esters such as methyl 2-hydroxypropionate and ethyl 2-hydroxypropionate; esters such as ethyl 2-hydroxy-2-methylpropionate, 3-methyl-3-methoxybutyl propionate, methyl 3-methoxypropionate, ethyl 3-ethoxypropionate, ethyl ethoxyacetate, ester hydroxyacetate, ethyl acetate, n-butyl acetate, isobutyl acetate, n-butyl propionate, methyl acetoacetate, n-amyl formate and ethyl pyruvate; aromatic hydrocarbons such as toluene and xylene; and amides such as N-methylpyrrolidone, N,N-dimethylformamide and N,N-dimethylacetamide. These dispersion media may be used singly or as a mixture of two or more of them.

The aqueous medium may consist of water alone or a combination of water and a water-miscible organic dispersion medium.

For producing the pigment dispersion composition using a mixture comprising the above pigment, carbodiimide compound, and at least one species selected from the pigment derivative, pigment intermediate, colorant derivative and colorant intermediate and/or a reaction product thereof, and a dispersion medium, a mixture comprising the above essential components and optionally a complementary color pigment, other additives, etc. are subjected to dispersion/treatment using a roll mill, kneader, high-speed stirrer, bead mill, ball mill, sand mill, ultrasonic dispersing apparatus, high-pressure dispersing apparatus, etc.

The total content of at least one species selected from the group consisting of the above pigment derivative, pigment intermediate, colorant derivative and colorant intermediate, and the carbodiimide compound in the pigment dispersion composition of the invention is preferably not less than 10% by mass, more preferably not less than 20% by mass but not more than 50% by mass relative to 100% by mass of the pigment. In addition, preferably, the content of these compounds are appropriately adjusted according to the required characteristics such as the pigment species, dispersibility, fluidity, and insulation properties, etc.

The pigment dispersion composition thus obtained has preferable fluidity and dispersion stability, and suitably utilized in the fields of printing inks, paints, pigment dispersion-based resist compositions for liquid crystal color filters or black matrices, inks for ink jet, inks for writing materials, ribbon inks, liquid developers and so forth, if necessary after supplementation with one or more of various binder resins, solvents, surfactants and other additives.

The pigment dispersion-based resist composition for black matrices and color filters as a preferred example of the use of the pigment dispersion composition according to the invention is now described in further detail.

The pigment dispersion-based resist composition is a resist composition which can be cured upon irradiation with actinic rays and can be developed with an alkali. It is mainly composed of the pigment dispersion composition of the invention, a film-forming resin, a photopolymerizable compound, a photopolymerization initiator and a solvent, if necessary together with one or more appropriate additives, for example a polymerization inhibitor.

As for the carbon black constituting the pigment dispersion-based resist composition for black matrices of the invention, a carbon black species whose mean primary particle size is not greater than 0.15 μm is preferred. When such a carbon black species is dispersed, the hue is preferably adjusted to neutral black by adding a complementary color pigment as necessary.

As for the organic pigment which constitutes the pigment dispersion-based resist composition for color filters of the invention, an organic pigment of high grade is preferably utilized for forming coatings having a vivid hue.

The film-forming resins for constituting the pigment dispersion-based resist composition of the invention include carboxyl group-containing, alkali-soluble copolymer resins obtained by reacting a carboxyl group-containing unsaturated monomer, such as acrylic acid, methacrylic acid, itaconic acid, maleic acid, maleic anhydride, a maleic acid monoalkyl ester, citraconic acid, citraconic anhydride, a citraconic acid monoalkyl ester, with at least one monomer selected from the group consisting of styrene, 2-hydroxyethyl acrylate, 2-hydroxyethyl methacrylate, allyl acrylate, allyl methacrylate, benzyl acrylate, benzyl methacrylate, glycerol monoacrylate, glycerol methacrylate, N-phenylmaleimide, polystyrene macromonomers and polymethyl methacrylate macromonomers. They can be used singly or as a mixture of two or more of them.

The photopolymerizable compound which constitutes the pigment dispersion-based resist composition of the invention is a monomer or oligomer having a photopolymerizable unsaturated bond(s), and the like.

As example of the monomer having one photopolymerizable unsaturated bond within the molecule, there may be mentioned alkyl methacrylates or acrylates such as methyl methacrylate, butyl methacrylate, 2-ethylhexyl methacrylate, methyl acrylate, butyl acrylate and 2-ethylhexyl acrylate; aralkyl methacrylates or acrylates such as benzyl methacrylate and benzyl acrylate; alkoxyalkyl methacrylates or acrylates such as butoxyethyl methacrylate and butoxyethyl acrylate; aminoalkyl methacrylates or acrylates such as N,N-dimethylaminoethyl methacrylate and N,N-dimethylaminoethyl acrylate; methacrylic acid esters or acrylic acid esters of polyalkylene glycol monoalkyl ethers such as diethylene glycol monoethyl ether, triethylene glycol monobutyl ether and dipropylene glycol monomethyl ether; methacrylic acid esters or acrylic acid esters of polyalkylene glycol monoaryl ethers such as hexaethylene glycol monophenyl ether; isobornyl methacrylate or acrylate; glycerol methacrylates or acrylates; 2-hydroxyethyl methacrylate or acrylate, etc.

As example of the monomer having two or more photopolymerizable unsaturated bonds within the molecule, there may be mentioned bisphenol A dimethacrylate, 1,4-butanediol dimethacrylate, 1,3-butylene glycol dimethacrylate, diethylene glycol dimethacrylate, glycerol dimethacrylate, neopentyl glycol dimethacrylate, polyethylene glycol dimethacrylate, polypropylene glycol dimethacrylate, tetraethylene glycol dimethacrylate, trimethylolpropane trimethacrylate, pentaerythritol trimethacrylate, pentaerythritol tetramethacrylate, dipentaerythritol tetramethacrylate, dipentaerythritol hexamethacrylate, dipentaerythritol pentamethacrylate, bisphenol A diacrylate, 1,4-butanediol diacrylate, 1,3-butylene glycol diacrylate, diethylene glycol diacrylate, glycerol diacrylate, neopentyl glycol diacrylate, polyethylene glycol diacrylate, polypropylene glycol diacrylate, tetraethylene glycol diacrylate, trimethylolpropane triacrylate, pentaerythritol triacrylate, pentaerythritol tetraacrylate, dipentaerythritol tetraacrylate, dipentaerythritol hexaacrylate, dipentaerythritol pentaacrylate, and the like. These photopolymerizable compounds can be used singly or in combination of two or more of them. As the oligomer having the above photopolymerizable unsaturated bond, those obtainable by appropriately polymerizing the above monomers can be used.

The photopolymerization initiators which constitute the pigment dispersion-based resist composition of the invention are not particularly restricted but include, for example, benzophenone, N,N'-tetraethyl-4,4'-diaminobenzophenone, 4-methoxy-4'-dimethylaminobenzophenone, benzil, 2,2-diethoxyacetophenone, benzoin, benzoin methyl ether, benzoin isobutyl ether, benzil dimethyl ketal, α-hydroxyisobutyrophenone, thioxanthone, 2-chlorothioxanthone, 1-hydroxycyclohexyl phenyl ketone, tert-butylanthraquinone, 1-chloroanthraquinone, 2,3-dichloroanthraquinone, 3-chloro-2-methylanthraquinone, 2-ethylanthraquinone, 1,4-naphthoquinone, 1,2-benzanthraquinone, 1,4-dimethylanthraquinone, 2-phenylanthraquinone, and triazine type photopolymerization initiators. These photopolymerization initiators are used singly or in combination of two or more of them.

The solvent which constitutes the pigment dispersion-based resist composition of the invention may be the same as the dispersion medium mentioned hereinabove and preferably is one having a boiling point of 100 to 220° C. at atmospheric pressure ($1.013 \times 10^2$ kPa) as selected from among ester type organic solvents, ether type organic solvents, ether ester type organic solvents, ketone type organic solvents, aromatic hydrocarbon solvents and nitrogen-containing organic solvents, and the like.

As specific examples, there may be mentioned ether type organic solvents such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, propylene glycol monomethyl ether, propylene glycol monoethyl ether, propylene glycol monobutyl ether, diethylene glycol diethyl ether, diethylene glycol dimethyl ether and diethylene glycol methyl ethyl ether; ether ester type organic solvents such as ethylene glycol monomethyl ether acetate, ethylene glycol monoethyl ether acetate, ethylene glycol monobutyl ether acetate, propylene glycol monomethyl ether acetate and propylene glycol monoethyl ether acetate; ketone type organic solvents such as methyl isobutyl ketone, cyclohexanone, 2-heptanone and 67-butyrolactone; ester type organic solvents such as methyl 2-hydroxypropionate, ethyl 2-hydroxypropionate, ethyl 2-hydroxy-2-methylpropionate, 3-methyl-3-methoxybutyl propionate, methyl 3-methoxypropionate, ethyl 3-methoxypropionate, methyl 3-ethoxypropionate, ethyl 3-ethoxypropionate, ethyl ethoxyacetate, ethyl hydroxyacetate and n-amyl formate; nitrogen-containing organic solvents such as N-methylpyrrolidone, N,N-dimethylformamide and N,N-dimethylacetamide; and so forth. These may be used singly or as a mixture of two or more of them.

Preferred among these organic solvents from the solubility, dispersibility, applicability viewpoint, and the like, are diethylene glycol dimethyl ether, diethylene glycol methyl ethyl ether, ethylene glycol monomethyl ether acetate, propylene glycol monomethyl ether acetate, propylene glycol monoethyl ether acetate, cyclohexanone, 2-heptanone, ethyl 2-hydroxypropionate, 3-methyl-3-methoxybutyl propionate, ethyl 3-methoxypropionate, methyl 3-ethoxypropionate, n-amyl formate and the like. Propylene glycol monomethyl ether acetate is more preferred.

Further, from the viewpoint of the solubility of the alkali-soluble resin, the dispersibility of the pigment, the applicability, and the like, such organic solvents are preferably used in an amount of not less than 50% by mass, more preferably not less than 70% by mass, relative to the whole amount of the organic solvents used in the pigment dispersion-based resist composition of the invention.

When the content of an organic solvent(s) having a boiling point of 220° C. or above is high, the organic solvent may not be fully evaporated but partly remain in the dried coatings on the occasion of prebaking the coatings applied and formed, hence the heat resistance of the dried coatings may be deteriorated. When the content of an organic solvent(s) with a boiling point below 100° C. is high, it becomes difficult to apply the composition evenly and uniformly and, accordingly, it may become impossible to obtain coatings excellent in surface smoothness.

Furthermore, the pigment dispersion-based resist composition of the invention may contain, according to need, one or more of various additives such as other photopolymerizable compounds in addition to those mentioned above, thermal polymerization inhibitors, ultraviolet absorbers and antioxidants, each in an appropriate amount.

A method of producing the pigment dispersion-based resist composition of the invention using the materials mentioned above is now described.

The method of producing the pigment dispersion-based resist composition of the invention is an example of the mode of embodiment of the present invention and is by no means limitative of the scope of the present invention.

In producing the pigment dispersion-based resist composition of the invention from the constituent materials described above, use may be made of the method which comprises adding the photopolymerizable compound, photopolymerization initiator and film-forming resin, if necessary together with an organic solvent and another additive or other additives, to the pigment dispersion composition, and stirring/mixing them together using a stirring apparatus, for instance.

The pigment dispersion composition of the invention has good dispersion stability and fluidity even at high pigment content levels and, when carbon black is used as the pigment, the coatings formed therefrom show great hiding power and good insulating properties even when they are thin films and, when an organic pigment is used as the pigment, the coatings have high permeability and high contrast. Therefore, for example, the pigment dispersion composition of the invention can be adequately used as a material for producing black matrices which are required to have high insulating properties and in a pigment dispersion-based resist composition for color filters which are required to have high permeability and high contrast.

DETAILED DESCRIPTION OF THE INVENTION

The following examples illustrate the present invention more specifically. They are, however, by no means limitative of the scope of the invention. In the following examples, "part(s)" denotes "part(s) by mass", unless otherwise specified.

PREPARATION OF CARBODIIMIDE COMPOUNDS

Preparation Example 1

A four-necked flask equipped with a reflux condenser, nitrogen inlet tube, stirring rod and thermometer was charged with 76.3 parts of an isocyanate group-containing polycarbodiimide compound with a carbodiimide equivalent of 262, 113.7 parts of poly(3-methylpentyl adipate) diol with a molecular weight of 2,000, and 4.5 parts of methyl diethanolamine, and the mixture was subjected to reaction at about 100° C. for 8 hours. Thereafter, 291.7 parts of propylene glycol monomethyl ether acetate (hereinafter, referred to as PMAC for short) was added. A carbodiimide compound 1 (solid matter 40% by mass) with an average molecular weight of about 10,000 was thus obtained.

Preparation Example 2

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated polycaprolactone ring-opening polymerization product with a molecular weight of 2,000 was then added, and the whole mixture was maintained at about 100° C. for 2 hours to allow the carbodiimide group to react with the carboxyl group. Thereafter, 375.5 parts of PMAC was added. A carbodiimide compound 2 (solid matter 40% by mass) with a number average molecular weight of about 4,200 and a carbodiimide equivalent of 2,053 was thus obtained.

Preparation Example 3

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated propylene oxide ring-opening polymerization product with a molecular weight of 2,000 was then added, and the whole mixture was maintained at about 100° C. for 2 hours to allow the carbodiimide group to react with the carboxyl group. Thereafter, 375.5 parts of PMAC was added. A carbodiimide compound 3 (solid matter 40% by mass) with a number average molecular weight of about 4,200 and a carbodiimide equivalent of 2,053 was thus obtained.

Preparation Example 4

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated (meth)acrylic polymer with a molecular weight of 2,000 was then added, and the whole mixture was maintained at about 100° C. for 2 hours to allow the carbodiimide group to react with the carboxyl group. Thereafter, 375.5 parts of PMAC was added. A carbodiimide compound 4 (solid matter 40% by mass) with a number average molecular weight of about 4,200 and a carbodiimide equivalent of 2,053 was thus obtained.

Preparation Example 5

A four-necked flask equipped with a reflux condenser, nitrogen inlet tube, stirring rod and thermometer was charged with 128.7 parts of an isocyanate group-containing polycarbodiimide compound with a carbodiimide equivalent of 322 (product name "Carbodilite V-01", manufactured by Nisshinbo Industries, Inc., toluene 50% dilution), 151.5 parts of poly(3-methylpentyl adipate) diol with a molecular weight of 1,000, and 0.84 parts of tetrabutyl titanate, and the mixture was subjected to reaction at about 100° C. for 3 hours. Then, 17.7 parts of β-naphthoic acid was added and the whole mixture was maintained at about 100° C. for 3 hours to allow the carbodiimide group to react with the carboxyl group. Thereafter, 169.2 parts of PMAC was added, and the mixture was sieved using a 250-mesh sieve to obtain a compound containing a side chain having pigment adsorption ability within the molecule (carbodiimide-based compound 1 containing a side chain having pigment adsorption ability, a solution containing 50% by mass solid matter).

Preparation Example 6

A four-necked flask equipped with a reflux condenser, nitrogen inlet tube, stirring rod and thermometer was charged with 128.7 parts of an isocyanate group-containing polycarbodiimide compound with a carbodiimide equivalent of 322 (product name "Carbodilite V-01", manufactured by Nisshinbo Industries, Inc., toluene 50% dilution), 151.5 parts of poly(3-methylpentyl adipate) diol with a molecular weight of 1,000, and 0.84 parts of tetrabutyl titanate, and the mixture was subjected to reaction at about 100° C. for 3 hours. Then, 13.0 parts of 2-carboxypyrazine was added and the whole mixture was maintained at about 100° C. for 3 hours to allow the carbodiimide group to react with the carboxyl group. Thereafter, 159.8 parts of PMAC was charged, and the mixture was sieved using a 250-mesh sieve to obtain a compound containing a side chain having pigment adsorption ability within the molecule (carbodiimide-based compound 2 containing a side chain having pigment adsorption ability, a solution containing 50% by mass solid matter).

Preparation Example 7

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated polycaprolactone ring-opening polymerization product with a molecular weight of 2,000 was then added, and the whole mixture was maintained at about 100° C. for 2 hours to allow the carbodiimide group to completely react with the carboxyl group. Furthermore, 75.5 g of a sulfonated phthalocyanine blue was added and the mixture was subjected to reaction at about 100° C. until the carbodiimide group and sulfonic acid group were completely reacted. Thereafter, 325.8 parts of PMAC was added to obtain a compound containing a side chain having pigment adsorption ability and a polyester side chain within the molecule (carbodiimide-based compound 3 containing a side chain having pigment adsorption ability, a solution containing 50% by mass solid matter).

Preparation Example 8

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated polycaprolactone ring-opening polymerization product with a molecular weight of 2,000 was then added, and the whole mixture was maintained at about 100° C. for 2 hours to allow the carbodiimide group to completely react with the carboxyl group. Furthermore, 19.9 g of β-naphthoic acid was added and the mixture was subjected to reaction at about 100° C. until the carbodiimide group and carboxyl group were completely reacted. Thereafter, 270.2 parts of PMAC was added to obtain a compound containing a side chain having pigment adsorption ability and a polyester side chain within the molecule (carbodiimide-based compound 4 containing a side chain having pigment adsorption ability, a solution containing 50% by mass solid matter).

Preparation Example 9

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated propylene oxide ring-opening polymerization product with a molecular weight of 2,000 was then added, and the whole mixture was maintained at about 100° C. for 2 hours to allow the carbodiimide group to react with the carboxyl group. Then, 84.6 parts of a carboxyl group-terminated propylene oxide ring-opening polymerization product with a molecular weight of 2,000 was then added, and the whole mixture was maintained at about 100° C. for 2 hours to allow the carbodiimide group to completely react with the carboxyl group. Furthermore, 19.9 g of β-naphthoic acid was added and the mixture was subjected to reaction at about 100° C. until the carbodiimide group and carboxyl group were completely reacted. Thereafter, 270.2 parts of PMAC was added to obtain a compound containing a side chain having pigment adsorption ability and a polyester side chain within the molecule (carbodiimide-based compound 5 containing a side chain having pigment adsorption ability, a solution containing 50% by mass solid matter).

Preparation Example 10

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a carboxyl group-terminated (meth)acrylic polymer with a molecular weight of 2,000 was then added, and the whole mixture was maintained at about 100° C. for 2 hours to allow the carbodiimide group to completely react with the carboxyl group. Furthermore, 19.9 g of β-naphthoic acid was added and the mixture was subjected to reaction at about 100° C. until the carbodiimide group and carboxyl group were completely reacted. Thereafter, 270.2 parts of PMAC was added to obtain a compound containing a side chain having pigment adsorption ability and a polyacrylic side chain within the molecule (carbodiimide-based compound 6 containing a side chain having pigment adsorption ability, a solution containing 50% by mass solid matter).

Preparation Example 11

A four-necked flask equipped with a reflux condenser, nitrogen inlet tube, stirring rod and thermometer was charged with 50.0 parts of an isocyanate group-containing polycarbodiimide compound with a carbodiimide equivalent of 316 and 115.7 parts of poly(3-methylpentyl adipate) diol with a molecular weight of 1,000, the mixture was maintained at about 100° C. for 5 hours to allow the isocyanate group to react with the hydroxyl group, 84.6 parts of a (meth)acrylic polymer with a molecular weight of 2,000 was then added, and the whole mixture was maintained at about 100° C. for 2 hours to allow the carbodiimide group to completely react with the carboxyl group. Furthermore, 32.5 g of an anthraquinone derivative represented by the following formula was added and the mixture was subjected to reaction at about 100° C. until the carbodiimide group and carboxyl group were completely reacted. Thereafter, 282.8 parts of PMAC was added to obtain a compound containing a side chain having pigment adsorption ability and a polyacrylic side chain within the molecule (carbodiimide-based compound 7 containing a side chain having pigment adsorption ability, a solution containing 50% by mass solid matter).

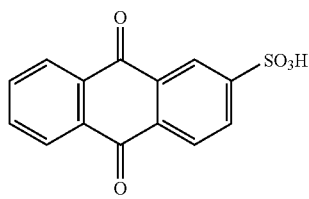

PREPARATION OF PIGMENT DISPERSION COMPOSITIONS

Example 1 to 20

The pigment dispersion compositions of Examples 1 to 20 were obtained by using C.I. Pigment Red 242 (specific surface area 90 m$^2$/g), Pigment Black 7, Pigment Green 36, and Pigment Red 254 as the pigments, carbodiimide compounds 1 to 4, carbodiimide-based compounds 1 to 7 containing side chains having pigment adsorption ability as the carbodiimide group-containing carbodiimide compounds, β-naphthoic acid, 2-carboxypyrazine, a phthalocyanine derivative containing one sulfonic acid group, and an anthraquinone derivative containing one sulfonic acid group as the coloring material derivatives and coloring material intermediates containing a carbodiimide group-reactive functional group and having adsorption ability on the pigment surface, and PMAC as the dispersion medium, so as to be the formulation constitutions shown in Tables 1 and 2, and kneading the mixtures in a bead mill at a temperature of 60° C. for 1 day.

Comparative Examples 1 to 8

The pigment dispersion compositions of Comparative Examples 1 to 8 were obtained by using C.I. Pigment Red 242 (specific surface area 90 m$^2$/g), Pigment Black 7, Pigment Green 36, and Pigment Red 254 as the pigments, Solsperse S24000 (product name, manufactured by Zeneca Corp.) as the pigment dispersant, a phthalocyanine derivative containing one sulfonic acid group, and an anthraquinone derivative containing one sulfonic acid group as the coloring material derivative and coloring material intermediate, and PMAC as the dispersion medium, so as to be the formulation constitutions shown in Tables 1 and 2, and kneading the mixtures in a bead mill at a temperature of 60° C. for 1 day.

<Evaluation Test>

(Pigment Dispersibility)

For the pigment dispersion compositions of Examples 1 to 5, Example 11, Example 12, Comparative Example 1, and Comparative Example 8, the viscosities at 25° C. (initial viscosity) was measured using a B type viscometer to evaluate pigment dispersibilities. The evaluation results are shown in Tables 1 and 2.

(Dispersion Stability 1)

The pigment dispersion compositions of Examples 1 to 5, Example 11, Example 12, Comparative Example 1, and Comparative Example 8 were stored in a temperature-controlled room at 40° C. for 7 days, and the viscosities at 25° C. (time-lapse viscosity) were measured using a B type viscometer to evaluate dispersion stabilities. The evaluation results are shown in Tables 1 and 2.

(Dispersion Stability 2)

The pigment dispersion compositions of Examples 1 to 20 and Comparative Examples 1 to 8 were each sampled and placed in a glass bottle and, after tight closure, stored at room temperature for 7 days, and the states of the compositions were then evaluated according to the criteria given below. The results are shown in Tables 1 and 2.

Evaluation Criteria

A: Neither viscosity increase nor precipitate formation is observed.
B: Such an extent of viscosity increase and/or precipitate formation that can be returned to the original state upon gentle shaking is observed.
C: Such an extent of viscosity increase and/or precipitate formation that cannot be returned to the original state even upon vigorous shaking is observed.

(Bleeding ability)

To pigment dispersion compositions of Examples 6 to 10 and Comparative Examples 3 to 7 in which a pigment derivative and colorant derivative had been used, water was mixed. Then, water was extracted and evaluated whether being colored according to the criteria given below. The results are shown in Tables 1 and 2.

Evaluation Criteria

A: There is no coloration
B: There is little coloration
C: There is coloration

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| C. I. Pigment Red 242 | 16 | 16 | 16 | 16 | 16 | — | — | — | — | — |
| Pigment Black 7 (neutral) | — | — | — | — | — | 20 | 20 | — | — | — |
| Pigment Green 36 | — | — | — | — | — | — | — | 16 | 16 | — |
| Pigment Red 254 | — | — | — | — | — | — | — | — | — | 16 |
| Carbodiimide compound 1 (solid matter 40% by mass) | 16 | — | — | — | — | — | — | — | — | — |
| Carbodiimide compound 2 (Polyester chain, solid matter 40% by mass) | — | 16 | — | — | — | 11.3 | 7.5 | 9.0 | 6.0 | 7.0 |
| Carbodiimide compound 3 (Polyether chain, solid matter 40% by mass) | — | — | 16 | — | — | — | — | — | — | — |

TABLE 1-continued

| | | | | | | | | | | |
|---|---|---|---|---|---|---|---|---|---|---|
| Carbodiimide compound 4 (Polyacrylic chain, solid matter 40% by mass) | — | — | — | 16 | 16 | — | — | — | — | — |
| β-naphthoic acid | 0.8 | 0.8 | 0.8 | 0.8 | — | — | — | — | — | — |
| 2-carboxypyrazine | — | — | — | — | 0.8 | — | — | — | — | — |
| Phthalocyanine derivative containing one sulfonic acid group within the molecule | — | — | — | — | — | 1.44 | 0.95 | 1.14 | 0.76 | — |
| Anthraquinone derivative containing one sulfonic acid group wihin the molecule | — | — | — | — | — | — | — | — | — | 0.39 |
| Solsperse 24000 | — | — | — | — | — | — | — | — | — | — |
| PMAC | 67.2 | 67.2 | 67.2 | 67.2 | 67.2 | 67.26 | 71.55 | 73.86 | 77.24 | 76.61 |
| Total | 100 | 100 | 100 | 100 | 100 | 100 | 100 | 100 | 100 | 100 |
| Evaluation test  Initial viscosity | 20.0 cp | 23.0 cp | 25.0 cp | 15.0 cp | 14.0 cp | — | — | — | — | — |
| Viscosity after 7 days at 40° C. | 50.0 cp | 35.0 cp | 37.5 cp | 21.2 cp | 20.0 cp | — | — | — | — | — |
| Dispersion stability | A | A | A | A | A | A | A | A | A | A |
| Breeding ability | — | — | — | — | — | A | A | A | A | A |

| | Comparative Example | | | | | | |
|---|---|---|---|---|---|---|---|
| | 1 | 2 | 3 | 4 | 5 | 6 | 7 |
| C. I. Pigment Red 242 | 16 | — | — | — | — | — | — |
| Pigment Black 7 (neutral) | — | 20 | 20 | 20 | — | — | — |
| Pigment Green 36 | — | — | — | — | 16 | 16 | — |
| Pigment Red 254 | — | — | — | — | — | — | 16 |
| Carbodiimide compound 1 (solid matter 40% by mass) | — | — | — | — | — | — | — |
| Carbodiimide compound 2 (Polyester chain, solid matter 40% by mass) | — | — | — | — | — | — | — |
| Carbodiimide compound 3 (Polyether chain, solid matter 40% by mass) | — | — | — | — | — | — | — |
| Carbodiimide compound 4 (Polyacrylic chain, solid matter 40% by mass) | — | — | — | — | — | — | — |
| β-naphthoic acid | — | — | — | — | — | — | — |
| 2-carboxypyrazine | — | — | — | — | — | — | — |
| Phthalocyanine derivative containing one sulfonic acid group within the molecule | — | — | 1.44 | 0.95 | 1.14 | 0.76 | — |
| Anthraquinone derivative containing one sulfonic acid group wihin the molecule | — | — | — | — | — | — | 0.39 |
| Solsperse 24000 | 6.4 | 6.0 | 4.5 | 3.0 | 3.6 | 2.4 | 2.8 |
| PMAC | 77.6 | 82.0 | 74.06 | 76.05 | 79.26 | 80.84 | 80.81 |
| Total | 100 | 100 | 100 | 100 | 100 | 100 | 100 |
| Evaluation test  Initial viscosity | >50 poise | — | — | — | — | — | — |
| Viscosity after 7 days at 40° C. | — | — | — | — | — | — | — |
| Dispersion stability | C | C | A | C | A | C | C |
| Breeding ability | — | — | C | C | C | C | C |

TABLE 2

| | Example | | | | | | | | | | Compar. Ex. |
|---|---|---|---|---|---|---|---|---|---|---|---|
| | 11 | 12 | 13 | 14 | 15 | 16 | 17 | 18 | 19 | 20 | 8 |
| C. I. Pigment Red 242 | 16.0 | 16.0 | — | — | — | — | — | 16.0 | 16.0 | 16.0 | 16.0 |
| Pigment Black 7 (neutral) | — | — | 20.0 | 20.0 | — | — | — | — | — | — | — |
| Pigment Green 36 | — | — | — | — | 16.0 | 16.0 | — | — | — | — | — |
| Pigment Red 254 | — | — | — | — | — | — | 16.0 | — | — | — | — |
| Pigment-adsorbing side chain-containing compound 1 (solid matter 50% by mass) | 9.6 | — | — | — | — | — | — | — | — | — | — |
| Pigment-adsorbing side chain-containing compound 2 (solid matter 50% by mass) | — | 9.6 | — | — | — | — | — | — | — | — | — |
| Pigment-adsorbing side chain-containing compound 3 (solid matter 50% by mass) | — | — | 12.0 | 8.0 | 9.6 | 6.4 | — | — | — | — | — |
| Pigment-adsorbing side chain-containing compound 4 (solid matter 50% by mass) | — | — | — | — | — | — | 9.6 | — | — | — | — |

TABLE 2-continued

|  | Example | | | | | | | | | | Compar. Ex. |
|---|---|---|---|---|---|---|---|---|---|---|---|
|  | 11 | 12 | 13 | 14 | 15 | 16 | 17 | 18 | 19 | 20 | 8 |
| Pigment-adsorbing side chain-containing compound 5 (solid matter 50% by mass) | — | — | — | — | — | — | — | — | 9.6 | — | — |
| Pigment-adsorbing side chain-containing compound 6 (solid matter 50% by mass) | — | — | — | — | — | — | — | — | — | 9.6 | — |
| Pigment-adsorbing side chain-containing compound 7 (solid matter 50% by mass) | — | — | — | — | — | — | 6.4 | — | — | — | — |
| Solsperse 24000 | — | — | — | — | — | — | — | — | — | — | 4.8 |
| PMAC | 74.4 | 74.4 | 68.0 | 72.0 | 74.4 | 78.6 | 78.6 | 74.4 | 74.4 | 74.4 | 79.2 |
| Total | 100.0 | 100.0 | 100.0 | 100.0 | 100.0 | 100.0 | 100.0 | 100.0 | 100.0 | 100.0 | 100.0 |
| Evaluation test — Initial viscosity | 20 cp | 15 cp | — | — | — | — | — | — | — | — | 50 poise |
| Viscosity after 7 days at 40° C. | 50 cp | 30 cp | — | — | — | — | — | — | — | — | — |
| Dispersion stability | A | A | A | A | A | A | A | A | A | A | C |
| Breeding ability | — | — | A | A | A | A | A | — | — | — | C |

In Tables 1 and 2, numeric values representing the compositions are "part".

<Pigment Dispersion-Based Resist Compositions for Color Filters of Examples 1 to 5, 8 to 12, 15 to 20, and Comparative Examples 1 and 5 to 8>

Using a high-speed stirrer, the pigment dispersion compositions of Examples 1 to 5, 8 to 12, 15 to 20 and Comparative Examples 1 and 5 to 8, and other materials were uniformly mixed so as to be the formulations in Table 3, and then filtered through a 3 μm-filter to obtain the pigment dispersion-based resist compositions for color filters of Examples 1 to 5, 8 to 12, 15 to 20, and Comparative Examples 1 and 5 to 8.

<Evaluation Test>

(Dispersion Stability)

The pigment dispersion-based resist compositions for color filters of Examples 1 to 5, 8 to 12, 15 to 20, and Comparative Examples 1 and 5 to 8 were each sampled and placed in a glass bottle and, after tight closure, stored at room temperature for 7 days, and the states of the compositions were then evaluated according to the criteria given below. The results are shown in Table 3.

Evaluation Criteria

A: Neither viscosity increase nor precipitate formation is observed.
B: Such an extent of viscosity increase and/or precipitate formation that can be returned to the original state upon gentle shaking is observed.
C: Such an extent of viscosity increase and/or precipitate formation that cannot be returned to the original state even upon vigorous shaking is observed.

(Resist Pattern Developability)

Those pigment dispersion-based resist compositions for color filters which had been given the evaluation A or B in the above dispersion stability evaluation were each applied to a glass substrate to a film thickness of 1 μm using a spin coater. Each coat film was prebaked at 100° C. for 3 minutes. The coat film obtained was developed using an aqueous 0.15% solution of Na$_2$CO$_3$, and the developability thereof was evaluated in terms of the time required for complete removal of the uncured portion of the resist composition. The evaluation results are shown in Table 3.
A: Complete removal attainable within 30 seconds.
B: Complete removal attainable within a time longer than 30 seconds but not longer than 60 seconds.
C: No complete removal attainable even after 60 seconds.

<Preparation of Pigment Dispersion-Based Resist Compositions for Black Matrices>

Pigment dispersion-based resist compositions for black matrices of Examples 6, 7, 13 and 14, and Comparative Examples 2 to 4 were obtained by uniformly mixing, using a high-speed stirrer, each of the above-mentioned pigment dispersion compositions of Examples 6, 7, 13 and 14, and Comparative Examples 2 to 4 with the other materials so as to be the formulation shown in Table 4, followed by filtration through a 3 μm-filter.

<Evaluation Test>

(Dispersion Stability)

The pigment dispersion-based resist compositions for black matrices of Examples 6, 7, 13, 14 and Comparative Examples 2 to 4 were each sampled and placed in a glass bottle and, after tight closure, stored at room temperature for 7 days, and the states of the compositions were then evaluated according to the criteria given below. The results are shown in Table 4.

Evaluation Criteria

A: Neither viscosity increase nor precipitate formation is observed.
B: Such an extent of viscosity increase and/or precipitate formation that can be returned to the original state upon gentle shaking is observed.
C: Such an extent of viscosity increase and/or precipitate formation that cannot be returned to the original state even upon vigorous shaking is observed.

(Resist Pattern Optical Density (OD Value))

Those pigment dispersion-based resist compositions for black matrices which had been given the evaluation A or B in the above dispersion stability evaluation were each applied onto a glass substrate to a film thickness of 1 μm using a spin coater. After 3 minutes of prebaking at 100° C., each coat film was exposed to light from a high-pressure mercury lamp and further post-baked at 230° C. for 30 minutes to give an all over coated resist pattern. The optical density (OD value) of each all over coated resist pattern was measured on a Macbeth densitometer (TD-931, manufactured by GretagMacbeth AG.). The evaluation results thus obtained are shown in Table 4.

(Resist Pattern Resistance Value)

The surface resistance value of each resist pattern obtained by the above method was measured using a resistance measuring apparatus (R8340/8340A, brand name, manufactured by Avantest Corp.). The evaluation results are shown in Table 4.

(Resist Pattern Developability)

Those pigment dispersion-based resist compositions for black matrices which had been given the evaluation A or B in the above dispersion stability evaluation were each applied to a glass substrate to a film thickness of 1 μm using a spin coater. Each coat film was prebaked at 100° C. for 3 minutes. The coat film obtained was developed using an aqueous 0.15% solution of $Na_2CO_3$, and the developability thereof was evaluated in terms of the time required for complete removal of the uncured portion of the resist composition. The evaluation results are shown in Table 4.

A: Complete removal attainable within 30 seconds.

B: Complete removal attainable within a time longer than 30 seconds but not longer than 60 seconds.

C: No complete removal attainable even after 60 seconds.

TABLE 3

| | | | Pigment dispersion-based resist composition for color filters |||||||||||
|---|---|---|---|---|---|---|---|---|---|---|---|---|---|
| | | | Example |||||||||||
| | | | 1 | 2 | 3 | 4 | 5 | 8 | 9 | 10 | 11 | 12 | 15 |
| Pigment dispersion composition | Mixture type | Example 1 | 44.0 | — | — | — | — | — | — | — | — | — | — |
| | | Example 2 | — | 44.0 | — | — | — | — | — | — | — | — | — |
| | | Example 3 | — | — | 44.0 | — | — | — | — | — | — | — | — |
| | | Example 4 | — | — | — | 44.0 | — | — | — | — | — | — | — |
| | | Example 5 | — | — | — | — | 44.0 | — | — | — | — | — | — |
| | | Example 8 | — | — | — | — | — | 44.0 | — | — | — | — | — |
| | | Example 9 | — | — | — | — | — | — | 44.0 | — | — | — | — |
| | | Example 10 | — | — | — | — | — | — | — | 44.0 | — | — | — |
| | Side chain type | Example 11 | — | — | — | — | — | — | — | — | 44.0 | — | — |
| | | Example 12 | — | — | — | — | — | — | — | — | — | 44.0 | — |
| | | Example 15 | — | — | — | — | — | — | — | — | — | — | 44.0 |
| | | Example 16 | — | — | — | — | — | — | — | — | — | — | — |
| | | Example 17 | — | — | — | — | — | — | — | — | — | — | — |
| | | Example 18 | — | — | — | — | — | — | — | — | — | — | — |
| | | Example 19 | — | — | — | — | — | — | — | — | — | — | — |
| | | Example 20 | — | — | — | — | — | — | — | — | — | — | — |
| | | Comparative Example 1 | — | — | — | — | — | — | — | — | — | — | — |
| | | Comparative Example 5 | — | — | — | — | — | — | — | — | — | — | — |
| | | Comparative Example 6 | — | — | — | — | — | — | — | — | — | — | — |
| | | Comparative Example 7 | — | — | — | — | — | — | — | — | — | — | — |
| | | Comparative Example 8 | — | — | — | — | — | — | — | — | — | — | — |
| BMA/MAA copolymer | | | 6.9 | 6.9 | 6.9 | 6.9 | 6.9 | 6.9 | 6.9 | 6.9 | 6.9 | 6.9 | 6.9 |
| DPEHA | | | 3.0 | 3.0 | 3.0 | 3.0 | 3.0 | 3.0 | 3.0 | 3.0 | 3.0 | 3.0 | 3.0 |
| Irgacure 907 | | | 1.0 | 1.0 | 1.0 | 1.0 | 1.0 | 1.0 | 1.0 | 1.0 | 1.0 | 1.0 | 1.0 |
| PGMEA | | | 45.1 | 45.1 | 45.1 | 45.1 | 45.1 | 45.1 | 45.1 | 45.1 | 45.1 | 45.1 | 45.1 |
| Total | | | 100 | 100 | 100 | 100 | 100 | 100 | 100 | 100 | 100 | 100 | 100 |
| Evaluation | Dispersion stability | | B | A | A | A | A | A | A | A | A | A | A |
| | Developability | | B | B | A | B | B | B | B | B | B | B | B |

| | | | Pigment dispersion-based resist composition for color filters |||||||||||
|---|---|---|---|---|---|---|---|---|---|---|---|---|---|
| | | | Example ||||| Comparative Example |||||
| | | | 16 | 17 | 18 | 19 | 20 | 1 | 5 | 6 | 7 | 8 |
| Pigment dispersion composition | Mixture type | Example 1 | — | — | — | — | — | — | — | — | — | — |
| | | Example 2 | — | — | — | — | — | — | — | — | — | — |
| | | Example 3 | — | — | — | — | — | — | — | — | — | — |
| | | Example 4 | — | — | — | — | — | — | — | — | — | — |
| | | Example 5 | — | — | — | — | — | — | — | — | — | — |
| | | Example 8 | — | — | — | — | — | — | — | — | — | — |
| | | Example 9 | — | — | — | — | — | — | — | — | — | — |
| | | Example 10 | — | — | — | — | — | — | — | — | — | — |
| | Side chain type | Example 11 | — | — | — | — | — | — | — | — | — | — |
| | | Example 12 | — | — | — | — | — | — | — | — | — | — |
| | | Example 15 | — | — | — | — | — | — | — | — | — | — |
| | | Example 16 | 44.0 | — | — | — | — | — | — | — | — | — |
| | | Example 17 | — | 44.0 | — | — | — | — | — | — | — | — |
| | | Example 18 | — | — | 44.0 | — | — | — | — | — | — | — |
| | | Example 19 | — | — | — | 44.0 | — | — | — | — | — | — |
| | | Example 20 | — | — | — | — | 44.0 | — | — | — | — | — |
| | | Comparative Example 1 | — | — | — | — | — | 44.0 | — | — | — | — |
| | | Comparative Example 5 | — | — | — | — | — | — | 44.0 | — | — | — |
| | | Comparative Example 6 | — | — | — | — | — | — | — | 44.0 | — | — |
| | | Comparative Example 7 | — | — | — | — | — | — | — | — | 44.0 | — |
| | | Comparative Example 8 | — | — | — | — | — | — | — | — | — | 44.0 |

TABLE 3-continued

| | | | | | | | | | | |
|---|---|---|---|---|---|---|---|---|---|---|
| BMA/MAA copolymer | 6.9 | 6.9 | 6.9 | 6.9 | 6.9 | 6.9 | 6.9 | 6.9 | 6.9 | 6.9 |
| DPEHA | 3.0 | 3.0 | 3.0 | 3.0 | 3.0 | 3.0 | 3.0 | 3.0 | 3.0 | 3.0 |
| Irgacure 907 | 1.0 | 1.0 | 1.0 | 1.0 | 1.0 | 1.0 | 1.0 | 1.0 | 1.0 | 1.0 |
| PGMEA | 45.1 | 45.1 | 45.1 | 45.1 | 45.1 | 45.1 | 45.1 | 45.1 | 45.1 | 45.1 |
| Total | 100 | 100 | 100 | 100 | 100 | 100 | 100 | 100 | 100 | 100 |
| Evaluation Dispersion stability | A | A | A | A | A | C | A | C | C | C |
| Developability | B | B | B | A | B | — | B | — | — | — |

TABLE 4

| | | Pigment dispersion-based resist composition for black matrices | | | | | | |
|---|---|---|---|---|---|---|---|---|
| | | Example | | | | Comparative Example | | |
| | | 6 | 7 | 13 | 14 | 2 | 3 | 4 |
| Pigment dispersion composition | Example 6 | 40.0 | — | — | — | — | — | — |
| | Example 7 | — | 40.0 | — | — | — | — | — |
| | Example 13 | — | — | 40.0 | — | — | — | — |
| | Example 14 | — | — | — | 40.0 | — | — | — |
| | Comparative Example 2 | — | — | — | — | 40.0 | — | — |
| | Comparative Example 3 | — | — | — | — | — | 40.0 | — |
| | Comparative Example 4 | — | — | — | — | — | — | 40.0 |
| BMA/MAA copolymer | | 5.6 | 5.6 | 5.6 | 5.6 | 5.6 | 5.6 | 5.6 |
| DPEHA | | 2.4 | 2.4 | 2.4 | 2.4 | 2.4 | 2.4 | 2.4 |
| Irgacure 907 | | 0.8 | 0.8 | 0.8 | 0.8 | 0.9 | 0.9 | 0.9 |
| PGMEA | | 51.2 | 51.2 | 51.2 | 51.2 | 51.1 | 51.1 | 51.1 |
| Total | | 100.0 | 100.0 | 100.0 | 100.0 | 100.0 | 100.0 | 100.0 |
| Evaluation | Dispersion stability | A | A | A | A | C | B | C |
| | OD value | 3.9 | 3.8 | 3.9 | 3.8 | — | 3.8 | — |
| | Resistance value | $\geq 1 \times 10^{13}$ | $\geq 1 \times 10^{13}$ | $\geq 1 \times 10^{13}$ | $\geq 1 \times 10^{13}$ | — | $1 \times 10^{5}$ | — |
| | Developability | B | B | B | B | — | C | — |

In Tables 3 and 4, "BMA/MAA copolymer" stands for a benzyl methacrylate/methacrylic acid copolymer, "DPEHA" for dipentaerythritol hexaacrylate, "Irgacure 907" for 2-methyl-1[4-(methylthio)phenyl]-2-morpholinopropane-1-one (product name, manufactured by Ciba Speciality Chemicals), and "PGMEA" for propylene glycol monomethyl ether acetate. Additionally, numeric values representing the compositions are "part".

INDUSTRIAL APPLICABILITY

The pigment dispersion composition of the present invention has the constitutions mentioned above, and has preferable fluidity and dispersion stability, and thus can be suitably utilized in the fields of printing inks, paints, pigment dispersion-based resist compositions for liquid crystal color filters or liquid crystal black matrices, inks for ink jet, inks for writing materials, ribbon inks, liquid developers, and the like.

The invention claimed is:

1. A pigment dispersion composition
prepared by dispersing a pigment using at least one species selected from the group consisting of a pigment derivative, pigment intermediate, colorant derivative and colorant intermediate each having a functional group reactive with a carbodiimide group and having adsorption ability on a surface of said pigment, and a carbodiimide compound containing at least one carbodiimide group.

2. The pigment dispersion composition according to claim 1,
wherein the pigment is dispersed using a mixture comprising said at least one species selected from the group consisting of a pigment derivative, pigment intermediate, colorant derivative and colorant intermediate, and said carbodiimide compound.

3. The pigment dispersion composition according to claim 1,
wherein the pigment is dispersed by using a carbodiimide-based compound comprising at least one side chain having pigment adsorption ability by reacting said at least one species selected from the group consisting of a pigment derivative, pigment intermediate, colorant derivative and colorant intermediate with said carbodiimide compound.

4. The pigment dispersion composition according to claim 1,
wherein said carbodiimide compound comprises at least one side chain selected from the group consisting of a polyester side chain, polyether side chain, polyether polyester side chain, and polyacrylic side chain.

5. The pigment dispersion composition according to claim 1,
wherein said carbodiimide compound has a carbodiimide equivalent of 100 to 50,000.

6. The pigment dispersion composition according to claim 1,
wherein said functional group reactive with a carbodiimide group is at least one selected from the group consisting of a carboxyl group, a sulfonic acid group, and a phosphoric acid group.

7. The pigment dispersion composition according to claim 1,
wherein said pigment intermediate is at least one species selected from the group consisting of a naphthoic acid and 2-carboxypyrazine, and said colorant intermediate is a colorant residue having a functional group reactive with a carbodiimide group.

8. The pigment dispersion composition according to claim 1,
wherein said pigment is at least one pigment selected from the group consisting of a dye chelate pigment, azo pigment, benzimidazolone pigment, phthalocyanine pigment, quinacridone pigment, anthraquinone pigment, dioxazine pigment, indigo pigment, thioindigo pigment, perylene pigment, perinone pigment, diketopyrrolopyrrole pigment, isoindolinone pigment, nitro pigment, nitroso pigment, anthraquinone pigment, flavanthrone pigment, quinophthalone pigment, pyranthrone pigment, indanthrone pigment, and
said pigment derivative is a derivative of said pigment.

9. The pigment dispersion composition according to claim 1,
which is prepared by dispersing at least one pigment selected from the group consisting of carbon black and a phthalocyanine pigment using a phthalocyanine pigment derivative having a functional group reactive with a carbodiimide group as said pigment derivative.

10. A pigment dispersion-based resist composition which contains the pigment dispersion composition according to claim 1.

11. A compound for pigment treatment which is a carbodiimide-based compound comprising a side chain having pigment adsorption ability obtained by reacting at least one species selected from the group consisting of a pigment derivative, pigment intermediate, colorant derivative and colorant intermediate each having a functional group reactive with a carbodiimide group and having adsorption ability on a surface of a pigment, and
a carbodiimide compound containing at least one carbodiimide group.

12. A pigment dispersion composition comprising
a dispersion media and
a pigment having absorbed on a surface at least one species selected from the group consisting of a pigment derivative, pigment intermediate, colorant derivative and colorant intermediate, where said at least one species is bonded to a carbodiimide group.

13. A resist composition comprising
the pigment dispersion of claim 12,
a film-forming resin,
a photopolymerizable compound, and
a photopolymerization initiator.

* * * * *